L. L. KNOX.
REVERSING REGENERATIVE FURNACE.
APPLICATION FILED JAN. 9, 1913.

1,085,138.

Patented Jan. 27, 1914.
7 SHEETS—SHEET 1.

Fig. 1.

WITNESSES
R A Balderson
H M Conim

INVENTOR
L. L. Knox,
by Bakewell, Byrnes Parmelee,
Attys.

L. L. KNOX.
REVERSING REGENERATIVE FURNACE.
APPLICATION FILED JAN. 9, 1913.

1,085,138.

Patented Jan. 27, 1914.

L. L. KNOX.
REVERSING REGENERATIVE FURNACE.
APPLICATION FILED JAN. 9, 1913.

1,085,138.

Patented Jan. 27, 1914.

UNITED STATES PATENT OFFICE.

LUTHER L. KNOX, OF AVALON, PENNSYLVANIA, ASSIGNOR TO KEYSTONE FURNACE CONSTRUCTION COMPANY, OF PITTSBURGH, PENNSYLVANIA, A CORPORATION OF PENNSYLVANIA.

REVERSING REGENERATIVE FURNACE.

1,085,138.  Specification of Letters Patent.  Patented Jan. 27, 1914.

Application filed January 9, 1913. Serial No. 741,125.

*To all whom it may concern:*

Be it known that I, LUTHER L. KNOX, a citizen of the United States, residing at Avalon, in the county of Allegheny and State of Pennsylvania, have invented a new and useful Reversing Regenerative Furnace, of which the following is a full, clear, and exact description, reference being had to the accompanying drawings, forming part of this specification, in which—

My invention has relation to reversing regenerative furnaces, and is particularly adapted to open hearth steel furnaces.

The main object of my invention is to provide means of improved character for cooling and protecting the nose portions of the gas and air ports.

A further object is to improve the construction of the said ports and of the gas and air uptakes, and also the slag pots at the base of the uptakes.

My invention is also designed to improve the construction of the furnace in other respects as will hereinafter fully appear.

The nature of my invention will be best understood by reference to the accompanying drawings in which I have shown the preferred embodiments thereof, and which will now be described, it being premised, however, that the invention is susceptible to other embodiments without departing from the spirit and scope as defined in the appended claims.

Figure 1:
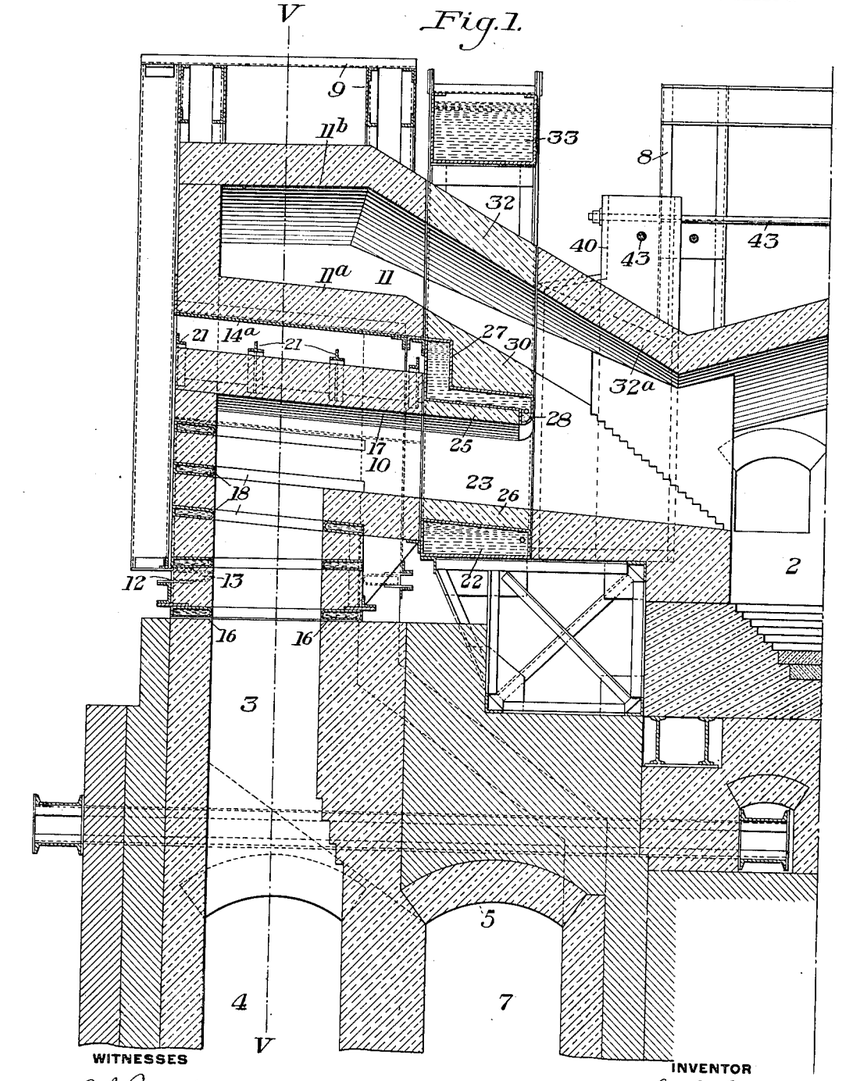
Figure 1 is a longitudinal vertical section of a portion of one end of one form of furnace embodying my invention.
Figure 2:
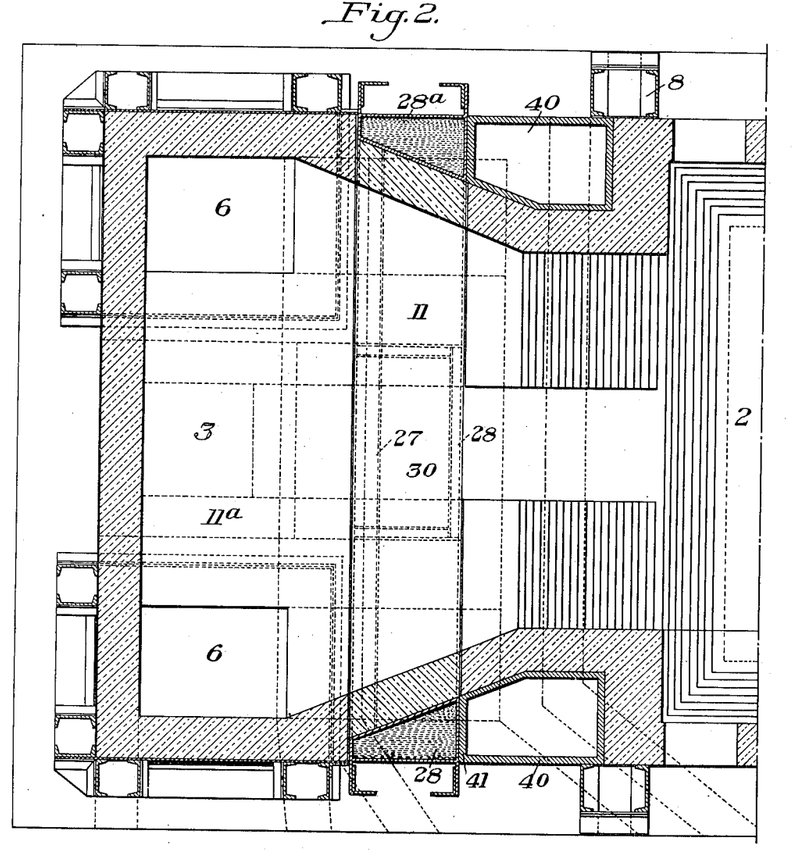
Fig. 2 is a horizontal section of the same.
Figures 3, 4:
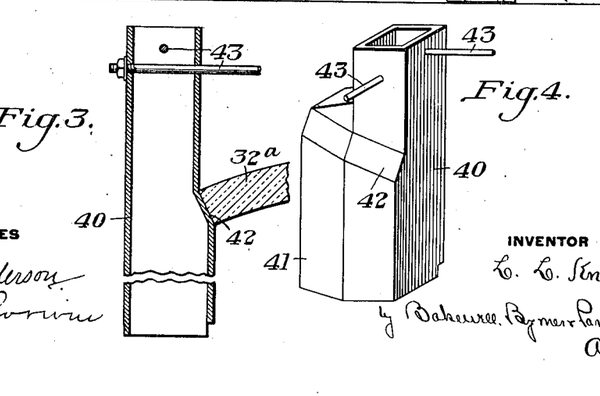
Fig. 3 is a detail sectional view showing the manner of supporting a portion of the roof arch.
Fig. 4 is a detail perspective view of a portion of one of the air coolers.
Figure 5:
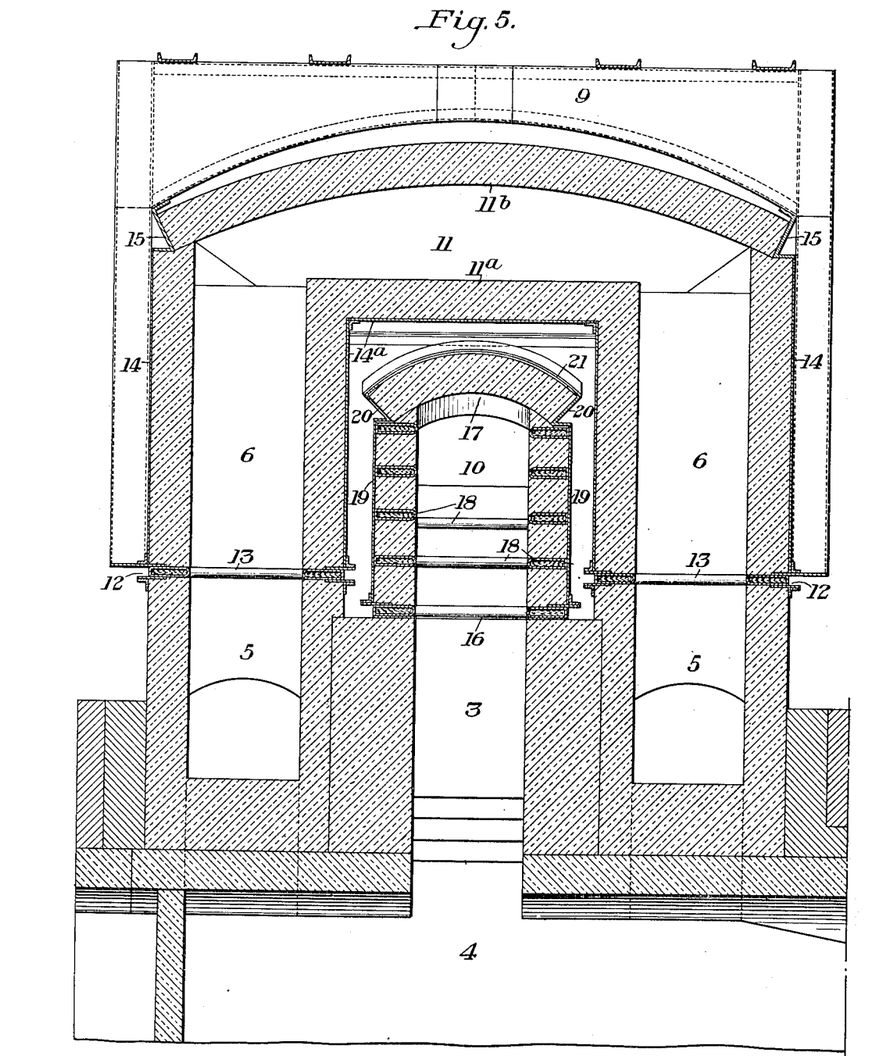
Fig. 5 is a vertical section taken on the line V—V of Fig. 1.

Referring first to that form of my invention which is shown in Figs. 1 to 8 inclusive, the numeral 2 designates the hearth portion of the furnace which may be of any usual or suitable construction; 3 the gas uptake having the slag pocket 4 at its lower end; and 5 the air uptakes, one at each side of the gas uptake, and having slag pockets 7 at their lower ends. 8 designates the frame work of the main furnace structure and 9 the frame work of the uptake and port portions of the furnace. 10 designates the gas port which leads into the furnace from the upper end of the gas uptake 3, and 11 is the air port which leads into the furnace over the gas port and with which the air uptakes 5 communicate at their upper ends. The upper sections 6 of the air uptakes, including the arched roof wall, are removable from the lower portions of the uptakes, the separation being at the joints 12 which are preferably provided with interposed water coolers 13. This upper removable portion of the air uptakes and air port is preferably provided with an exterior sheet metal casing 14, which is formed with the skews 15 for the ends of the roof arch 11$^b$, as best shown in Fig. 5. The inner wall of this inner section is also preferably provided with a sheet metal casing or lining 14$^a$. The rear portion of the gas port 10 and the upper portion of the gas uptake 3 also forms a removable unit, as best shown in Figs. 1 and 5, being supported at 16 on the walls of the lower portion of the uptake 3. This section is seated in the space between the upper uptake section 6, and is removable endwise therefrom. This removable section comprises side and end walls and a roof arch 17. The side and end walls are preferably provided with a series of water coolers 18 built therein, and are also provided with a metal casing 19 having upward extensions 20 which form skews to support the roof arch 17. This arch is further supported by the top binders 21 which are connected to flanges of the skews 20.

Figures 6, 7, 8:
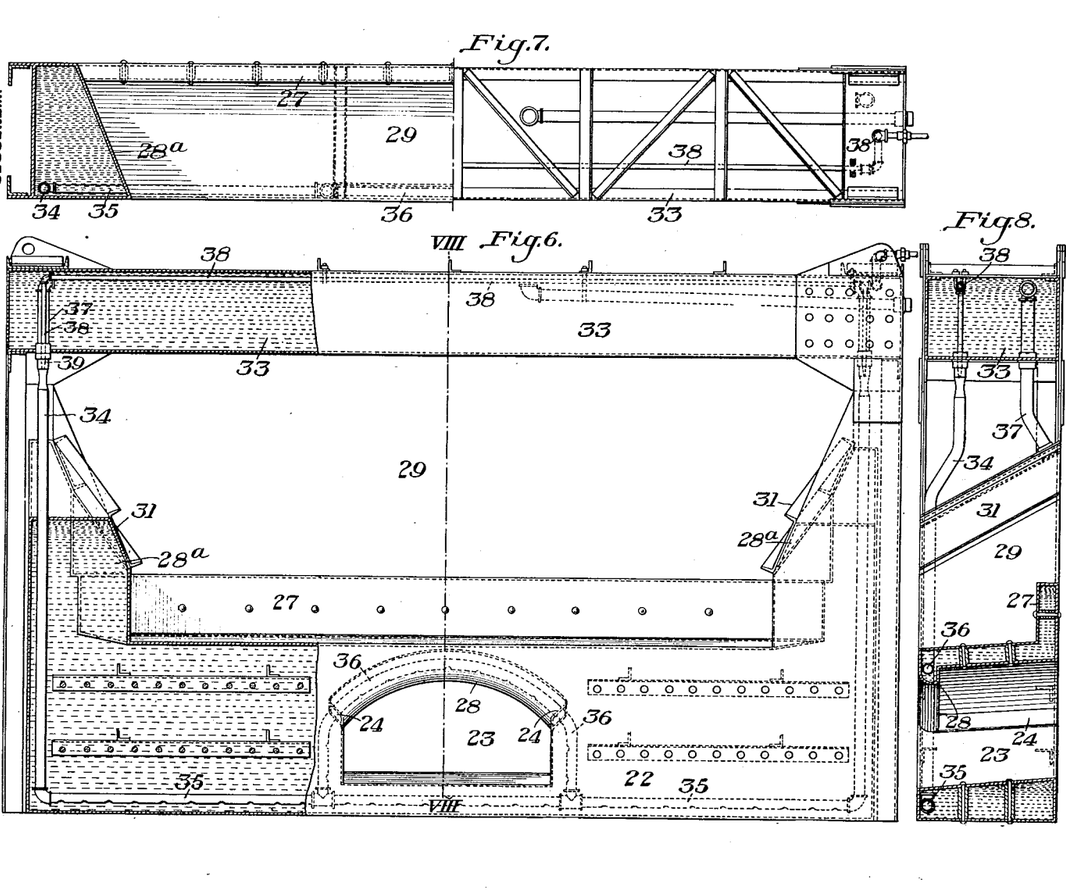
Fig. 6 is a view partly in side elevation and partly in vertical section of the frame of the removable section of the furnace, with the refractory parts removed.
Fig. 7 is a view of the same frame partly in top plan and partly in section.
Fig. 8 is a vertical section on the line VIII—VIII of Fig. 6.
Figure 9:
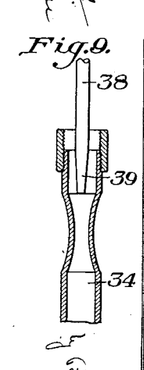
Fig. 9 is a detail sectional view of one of the injectors.

It has been found in practice that the nose or inner end portion of the gas port is the part of the furnace structure which most rapidly cuts away and becomes destroyed by the action of the furnace gases. If this portion of the gas port can be maintained in substantially its original form, comparatively little trouble is experienced with the rear portion of said port. I therefore form this nose or inner end portion of the gas port, as a separately removable section; and I also make this removable section form the nose end of the air port, including a section of the roof wall thereof. This removable section comprises a frame, which is preferably constructed of sheet metal. In Figs. 6, 7 and 8, I have shown the preferred construction of this frame. It is of general rectangular form extending the entire width of this portion of the furnace, and having an inclosed lower portion 22 forming a water chamber of relatively large volume and which surrounds the arched gas port opening 23. The arched top of this opening is formed with the skew surfaces 24 to carry the refractory arch lining 25, the sides and bottom of the opening being also lined with refractory material, as shown at 26. The portion of the inclosed water chamber above the opening 23 is preferably of L-shape (see Fig. 1) with the upwardly extending portion 27 at its rear end. It is also preferably formed with the downwardly extending lip or projection 28 at its forward end, and which acts to protect the end of the refractory arched lining 25. This portion of the removable section also has the extensions 28ᵃ at each side, and which project upwardly at opposite sides of the lower portion of the air port opening 29 of the removable section. This opening is lined with refractory material, as indicated at 30, this refractory material and the arched lining 25 substantially inclosing the upper portion of the water cooling chamber of the section. By the provision of the upward extension 27, I am able to extend the cooling effect to a point near the surface of the bottom lining 30 of the air port and thus secure a maximum cooling effect thereon. The upward extensions 28ᵃ carry skew channels 31 (see Figs. 6 and 8), which support the removable roof section 32 of the air port. These skews are inclined in two directions to suit the downward inclination of the air port roof and also the spring of the arch. At each end, the frame of the removable section is extended upwardly above the skew channels 31 to support a water tank 33 which extends the entire length of the section. Leading downwardly from each end of this tank is a vertical pipe 34 which extends to a point near the bottom of the inclosed water chamber at the lower portion of the section, the lower ends of the two vertical pipes being connected by a transversely extending perforated discharge pipe 35. This pipe 35 has a perforated branch or loop 36 extending upwardly and through the nose portion of the water cooled arch above said opening 23. The relatively cold water is thus discharged at the lower part of the removable section and directly against the walls of the gas port, where it is most effective. The heated water rises in each of its side extensions 28ᵃ and thence upwardly through the pipes 37 into the tank 33, where it is discharged. A portion of this discharged water will enter the open upper ends of the vertical pipes 34. This, however, is preferably supplemented by a fresh supply of cold water supplied by the pipe 38 having jet nozzles 39 which extend downwardly into the contracted upper portions of the vertical pipes 34. These jets or nozzles act as injectors which discharge a fresh supply of cold water through the pipes 34 and at the same time draw water from the circulating tank 33 in the said pipes 34. In this manner an efficient circulation of water is maintained in the cooling chambers of the removable section. The entire section can be removed either transversely or vertically, as may be desired, for repairs and a renewal of the refractory linings. The entire nose portion of the gas port is, by the construction described, surrounded by a relatively large body of cooling water, which is maintained in active circulation. The refractory wall between the nose portions of the gas and air ports is also well protected by the relatively large body of water therein, and also at the sides thereof, due to the upward extensions 28ᵃ, the latter extending upwardly to the base of the roof arch 32 at each side. The upper portion of the gas uptake and the rear part of the gas port are also well protected by the coolers 18. It will also be noted from Figs. 1 to 5 that there is an air chamber of considerable volume surrounding this part of the gas uptake and gas port, the roof arch 17 of this part of the gas port being separated from the bottom wall 11ᵃ of the rear portion of the air port. The entire gas port including the upper part of the gas uptake is thereby efficiently protected; and furthermore, the construction is such that any part of the gas port can be readily repaired.

Immediately forward of the removable section just described, I preferably provide the relatively large hollow vertical air coolers 40. These coolers, one at each side of the furnace, have offsets 41 at their lower portions, which abut directly against the upward extensions 28ᵃ of the removable section. Their inner faces are formed with skew surfaces 42 (see Figs. 3 and 4) which support the roof arch of the air port in front of the removable section. In addition to acting as air coolers for the adjacent part of the furnace structure, and as means for supporting the roof arch, these coolers also act as binders or buck-stays for the furnace walls, their upper reduced end portions projecting above the roof arches and being connected by longitudinal and transverse tie-bolts 43 (see Fig. 1).

Figure 13:
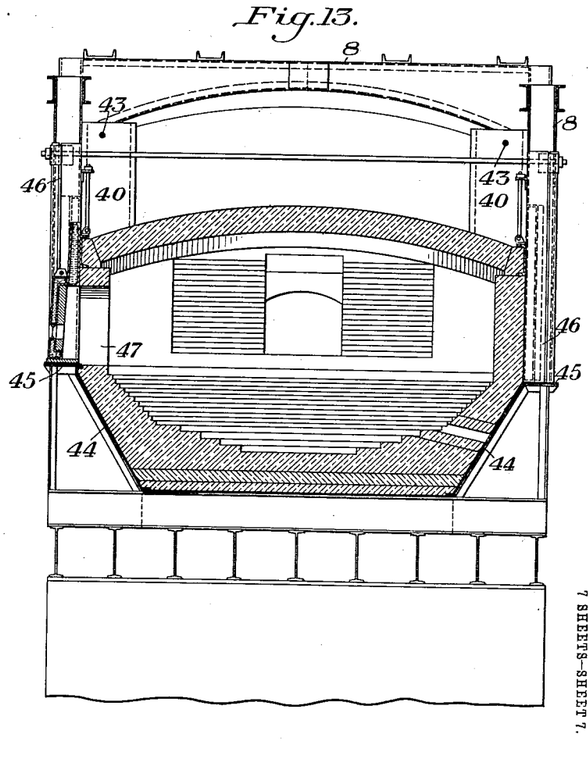
Fig. 13 is a transverse vertical section of a portion of the furnace structure and showing other features of my invention.

The hearth of the furnace is preferably set in the metal casing 44 (see Fig. 13) the upper edges of this casing being flanged outwardly to form seats 45 for the lower ends of the vertical buck-stays 46 of the main furnace frame 8. These flanges are preferably at the bottom level of the charging door openings 47. By this construction the upper part of the frame 8 can be readily dismantled to facilitate rebuilding or repairs of the furnace body and hearth.

Figure 10:
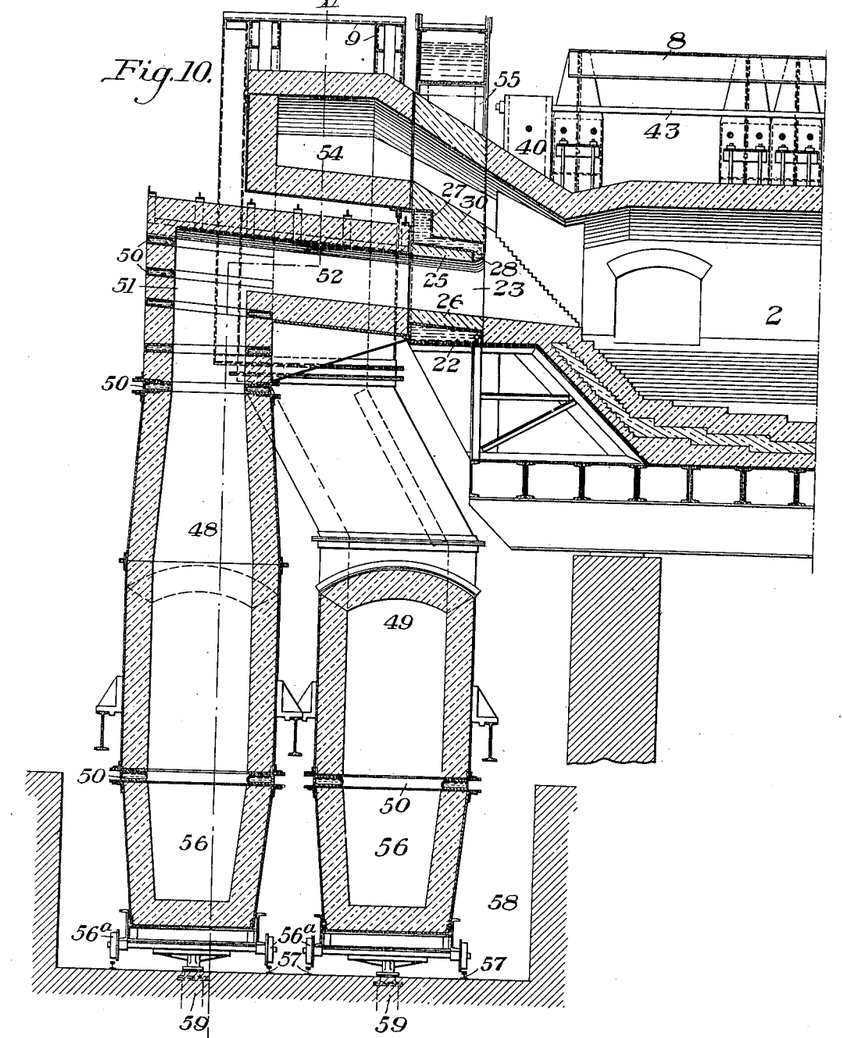
Fig. 10 is a view similar to Fig. 1 showing a modified construction.
Figure 11:
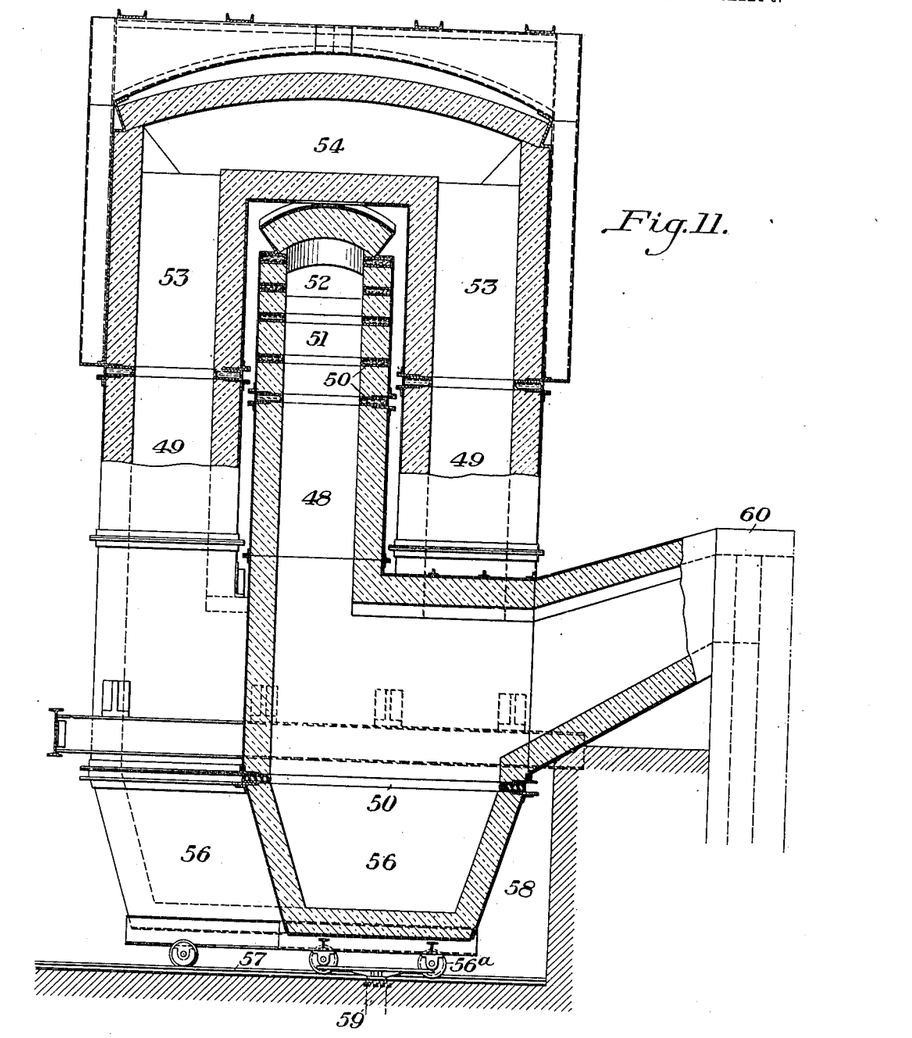
Fig. 11 is a section on the line XI—XI of Fig. 10.

In Figs. 10 and 11 I have shown my invention applied to that type of furnace in which the gas uptake 48 and the air uptakes 49 are constructed independently of each other and of the walls of the furnace proper, being surrounded by air. In this form the uptakes are preferably constructed in separable sections having water coolers 50 interposed between the joints thereof. The upper portion 51 of the gas uptake, and including the rear portion 52 of the gas port, is removable as a unit in substantially the same manner as in the form first described, the gas port 52 extending inwardly between the top sections 53 of the air uptakes. The latter, together with the rear portion 54 of the air port, can also be lifted and removed bodily as a unit, in substantially the same manner as first described. 55 designates the removable section which is similar to the removable section of the form first described. I have, in these figures, also shown the uptakes as being provided with removable slag pockets 56 mounted on the trucks 56ª adapted to be run on tracks 57 on the bottom of the pit 58. Placed underneath these trucks are hydraulic cylinders 59 whose plungers are adapted to raise the slag pockets and trucks off the tracks 57 when in proper positions underneath the respective uptakes, and thus seal the water cooler joints at the upper ends of the pockets. These pockets extend upwardly to a point just below the passages leading to the regenerators 60, as shown in Fig. 11.

Figure 12:
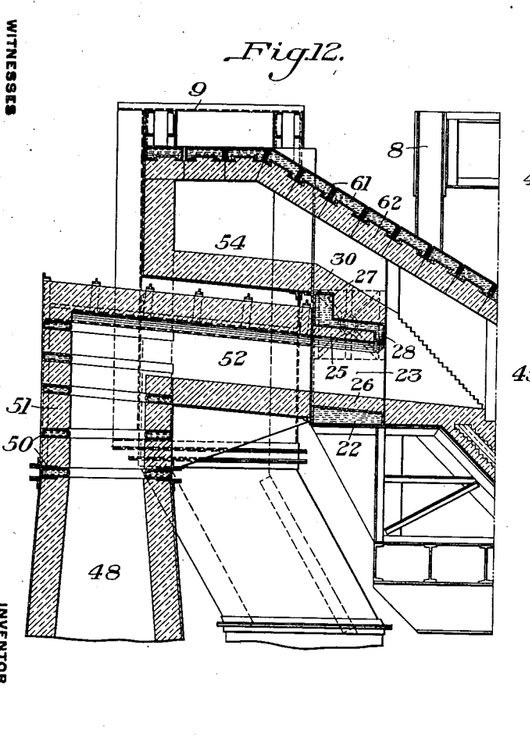
Fig. 12 is a vertical longitudinal section through one end portion of another form of furnace.

In Fig. 12, I have illustrated a modification of the removable section. In this form, instead of providing the section with a water circulating tank at its upper end, the entire roof of the air port is of sectional construction, being formed by transversely extending water coolers 61, which support the refractory arch 62. A part of these water cooled roof sections are carried by the removable section in the same manner as the portion of the roof arch in the form first described.

While, in the accompanying drawings, I have shown my invention as applied to one end only of a furnace, it will be understood that the construction at both ends will be substantially the same as that described.

My invention provides efficient means for the cooling of those parts of the ports and uptakes which are most subject to the destructive action of the hot gases; and furthermore, it provides for the ready removal and reconstruction of such parts.

I do not wish to limit myself to the restricted construction and arrangement which I have herein shown and described, as it will be obvious that the details can be widely varied within the spirit and scope of my invention.

My invention is also applicable to other types of furnaces than those which are herein illustrated.

I claim:

1. A structural member for use in the construction and cooling of reversing regenerative furnaces, said element comprising a unitary metallic frame having gas and air port openings and also having means for supporting refractory walls or linings for said openings, substantial portions of said frame adjacent to said openings being hollow to form cooling chambers; substantially as described.

2. A structural member for use in the construction and cooling of reversing regenerative furnaces, said element comprising a unitary metallic frame having gas and air port openings, and also having means for supporting refractory walls or linings for said openings, said frame having a hollow lower portion through which the gas port opening extends, and which is of a width substantially equal to the width of the air port opening, and which forms a cooling chamber; substantially as described.

3. A structural member for use in the construction and cooling of reversing regenerative furnaces, said element comprising a unitary metallic frame having gas and air port openings, and also having means for supporting refractory walls or linings for said openings, said frame having a hollow lower portion extending at each side of and above the gas port opening and forming a cooling chamber for the side and top walls of said opening; substantially as described.

4. A structural member for use in the construction and cooling of reversing regenerative furnaces, said member comprising a unitary metallic frame of general rectangular form with substantially parallel front and rear sides, said frame having gas and air port openings provided with means for supporting refractory walls for said openings, said frame having a hollow lower portion forming a cooling chamber; substantially as described.

5. A furnace of the character described, having a removable transverse section which carries the nose portion of the gas and air ports and also a part of the roof of the air port, said section having a water circulating tank mounted thereon, and connections leading from said tank to points adjacent to the nose portion of the gas port opening of said section; substantially as described.

6. A furnace of the character described, having a removable transverse section which carries the nose portion of the gas and air ports and also a part of the roof of the air port, said section having a cooling chamber completely surrounding the nose portion of the gas port, a water circulating tank also mounted on the removable section, and circulating connections extending from said tank to the cooling portion of the said section; substantially as described.

7. A furnace of the character described, having a removable transverse section which carries the nose portion of the gas and air ports and also a portion of the roof wall of the air port, said section comprising a frame having a water chamber therein surrounding its gas port opening and extending upwardly at the sides of its air port opening, and having skew channels at the sides of the last named opening for supporting a section of the roof arch; substantially as described.

8. A furnace of the character described, having a single unitary removable transverse section which carries the nose portions of the gas and air ports and also a portion of the roof arch of the air port, the furnace also having a removable portion which forms the rear part of the gas port, said section and portion being removable each independently of the other; substantially as described.

9. A furnace of the character described, having a single unitary removable transverse section which carries the nose portions of the gas and air ports and also a portion of the roof arch of the air port, the furnace also having an endwise removable portion which forms the rear part of the gas port and also the upper portion of the gas uptake, said section and portion being removable each independently of the other.

10. A furnace of the character described having a removable transverse section seated between the body of the furnace and the air and gas uptakes, said section comprising a unitary metallic frame having openings therethrough which form the inner end portions of the gas and air ports, said frame also having water chambers therein and being formed to support refractory linings for said port openings and also a section of the roof wall of the air port, the furnace also having removable uptake sections carrying the outer end portions of the gas and air ports; substantially as described.

11. A furnace of the character described, having a removable transverse section comprising a unitary frame seated between the body of the furnace and the gas and air uptakes, said frame having air and gas port openings and provided with means for supporting refractory walls or linings for said openings, substantial portions of said frame adjacent to said openings being hollow to form cooling chambers, substantially as described.

12. A furnace of the character described, having a removable transverse section comprising a unitary frame having air and gas port openings extending therethrough, and also having component portions thereof hollow to form a water chamber which entirely surrounds the gas port opening and is provided with means for carrying a refractory lining for said opening and also a refractory lining for the air port opening, and further having means for supporting a section of the air port roof wall; substantially as described.

13. A furnace of the character described, having a removable transverse section which carries the nose portions of the gas and air ports and also a portion of the roof wall of the air port, said section comprising a frame having a water chamber surrounding the gas port opening therein, the portion of said chamber above said opening having an upward extension at each side of the air port opening through the section; substantially as described.

14. A furnace of the character described, having a removable transverse section comprising a frame having openings therethrough which form the nose portions of the gas and air ports, said frame having a water cooled chamber which surrounds the gas port opening, the upper portion of said chamber having an upward extension at its rear end; substantially as described.

15. A furnace of the character described, having a removable transverse section comprising a frame having openings therethrough which form the nose portions of the gas and air ports, said frame having a water cooled chamber which surrounds the gas port opening, the upper portion of said water chamber having a downward extension at its forward end; substantially as described.

16. A furnace of the character described, having a removable section comprising a transverse portion which constitutes the rear part of the air port of the furnace and two downward extensions which constitute the upper part of the air-uptakes of the furnace, said removable section having refractory walls provided with metal casings, said casings having skew-forming extensions which support the arched roof member of the section over the gas port; substantially as described.

17. A furnace of the character described, having a removable section which forms the upper portion of the gas uptake furnace and also the rear portion of the gas port thereof, said section comprising refractory walls having a metal casing, said casing having skew-forming portions which support the roof arch of the section over the gas port; substantially as described.

18. A furnace of the character described, having hollow vertical air coolers at opposite sides thereof at points beyond the inner ends of the gas and air ports and between such ends and the hearth portion of the furnace, said coolers forming supports for portions of the furnace walls, and opening to the atmosphere at their upper ends; substantially as described.

19. A furnace of the character described, having hollow vertical air coolers at opposite sides thereof beyond the inner ends of the gas and air ports and between said ends at the hearth portion of the furnace, and means for tying said coolers together above the furnace roof to cause them to form a part of the furnace frame or bracing; substantially as described.

20. A furnace of the character described, having a hollow vertical post or column extending upwardly along its side wall adjacent to the inner ends of the gas and air ports of the furnace, and terminating in an open upper end at a point above the adjacent portion of the top roof of the furnace; substantially as described.

21. A furnace of the character described, having hollow vertical air coolers at opposite sides thereof adjacent to the inner ends of the gas and air ports, said coolers having supporting means for a portion of the roof wall of the furnace; substantially as described.

In testimony whereof, I have hereunto set my hand.

LUTHER L. KNOX.

Witnesses:
   Geo. H. Parmelee,
   H. M. Corwin.